Feb. 20, 1923.
B. C. COONS.
SEED CELL REMOVING APPARATUS.
FILED JULY 10, 1922.
1,445,998.
2 SHEETS—SHEET 1.
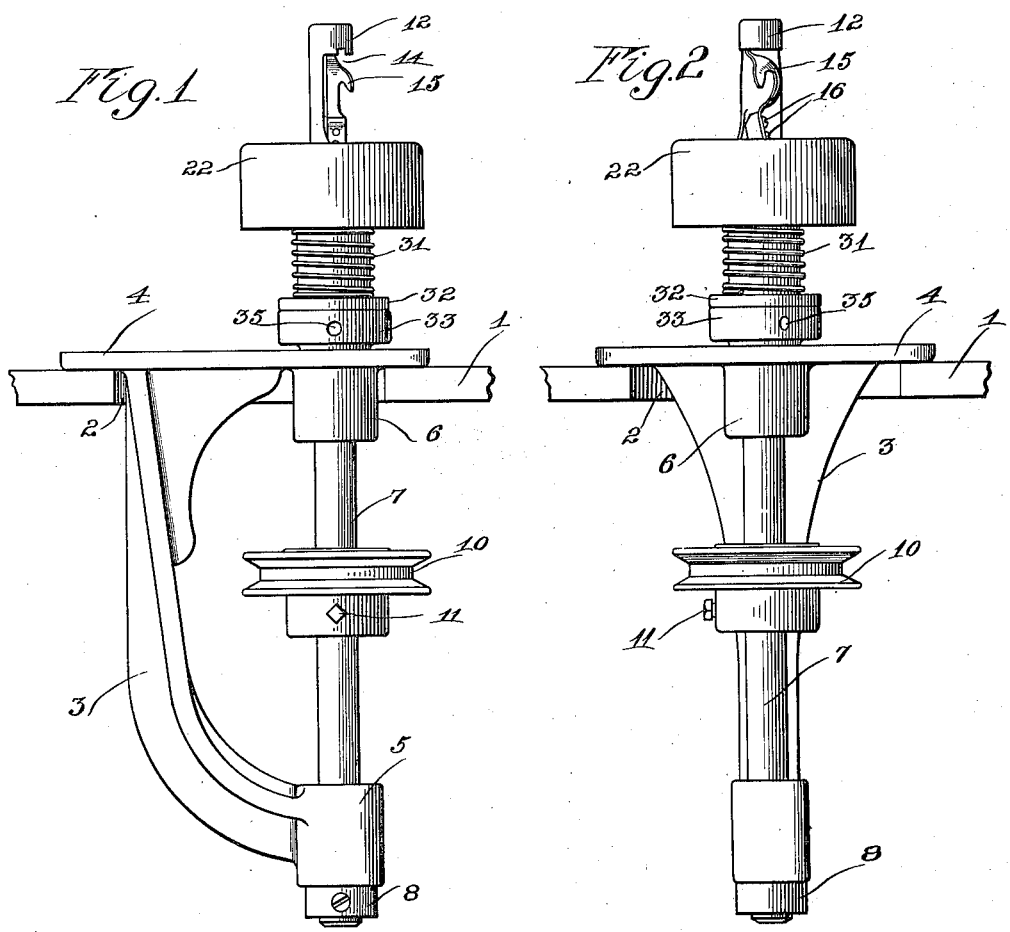
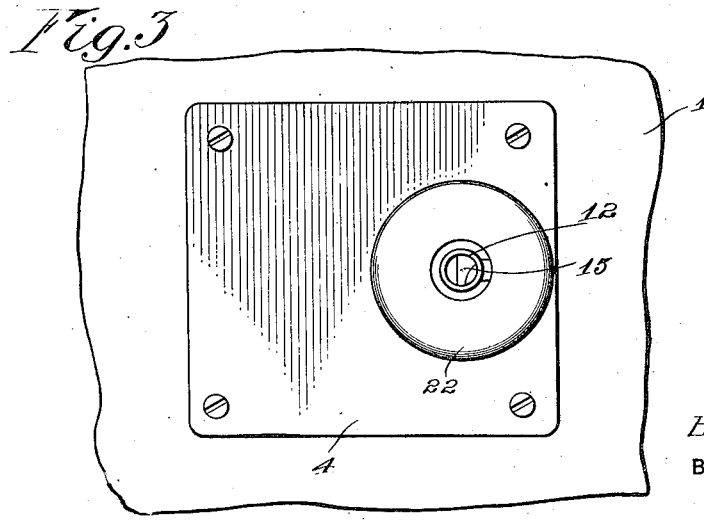
INVENTOR
Burton C. Coons
BY Davis & Timm
his ATTORNEYS Feb. 20, 1923.
B. C. COONS.
SEED CELL REMOVING APPARATUS.
FILED JULY 10, 1922.

INVENTOR
Burton C. Coons.
BY
Davis & Simms
HIS ATTORNEYS

Patented Feb. 20, 1923.

1,445,998

UNITED STATES PATENT OFFICE.

BURTON C. COONS, OF ROCHESTER, NEW YORK.

SEED-CELL-REMOVING APPARATUS.

Application filed July 10, 1922. Serial No. 573,899.

*To all whom it may concern:*

Be it known that I, BURTON C. COONS, a citizen of the United States, and resident of Rochester, in the county of Monroe and State of New York, have invented certain new and useful Improvements in a Seed-Cell-Removing Apparatus, of which the following is a specification.

The present invention relates to a seed cell removing apparatus for cored apples and more particularly to the type in which a rotary support for the cored apple is provided with a seed cell corer adapted to remove the seed cell from the cored apple placed upon said support. An object of this invention is to provide an improved means of operating said seed cell corer. Another object of the invention is to provide operating means for a seed cell corer having a member arranged to turn with the rotary support and adapted to be engaged by the cored apple, when fitted to the support for the purposes of moving the seed cell corer to effective position on the rotary support.

To these and other ends, the invention consists of certain parts and combinations of parts, all of which will be hereinafter described; the novel features being pointed out in the appended claims.

In the drawings:

Figs. 1 and 2 are two views in elevation of the seed cell removing apparatus;

Fig. 3 is a plan view;

Figure 4:
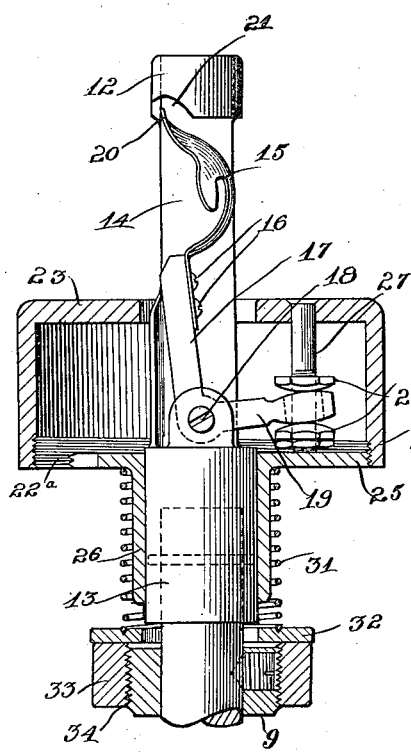
Fig. 4 is a sectional view showing the seed cell corer arranged in its protecting pocket.

Referring more particularly to the illustrated embodiment, 1 indicates a table having an opening 2 through which an arm 3 on a plate 4 extends. The arm 3 and plate 4 are provided, respectively with bearings 5 and 6 in which a shaft 7 turns, this shaft being held against axially movement in the bearings by a collar 8 on the lower end of the shaft and a collar 9 cooperating with the top surface of the plate 4. A pulley 10 is secured by a set screw 11 to the shaft 7 and this pulley acts as a means through which the shaft 7 is turned. On the upper end of the shaft a rotary support for the cored apple is secured. This rotary support has a cylindrical upper end 12 and a cylindrical lower portion 13. Between said portions a pocket or recess 14 is provided.

Figure 5:
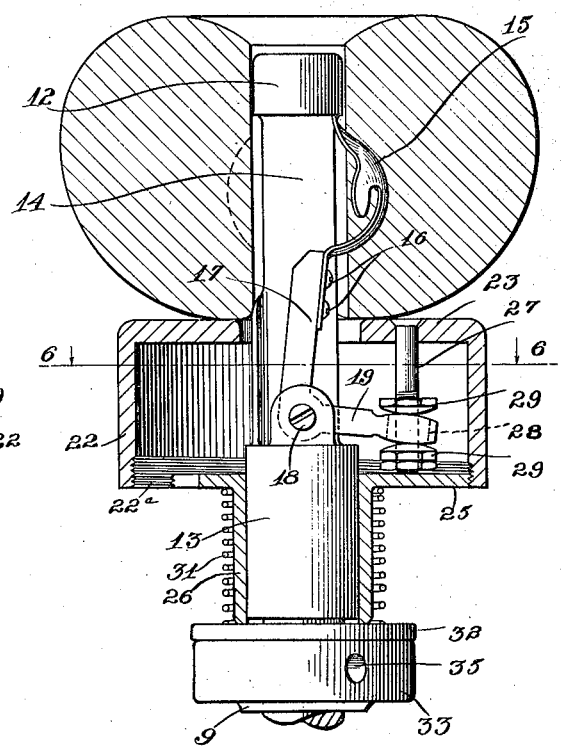
Fig. 5 is a similar view showing the seed cell corer projected from the protecting pocket to core an apple fitted to the rotary support.
Figure 6:
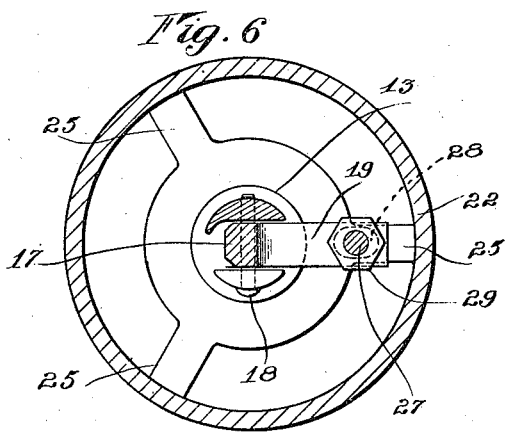
Fig. 6 is a section on the line 6—6, Fig. 5.

In the pocket 14 is arranged the seed cell corer which, in this instance, comprises a curved knife blade 15, secured at one end by screws 16 to one arm of a bell crank lever 17, which is pivoted at 18 to the bottom of the pocket and has its other arm 19 extending laterally from said pocket. The free end of the knife blade 15 is provided with an abutment portion 20, which operated in a pocket 21 formed in a cylindrical portion 12 and opening downwardly in the pocket 14. When in inoperative position, the abutment cooperates with one wall of the pocket 21, as illustrated in Fig. 4 and when in extreme operative position, this abutment 20 cooperates with the opposite wall of the pocket 21, as illustrated in Fig. 5.

With the end in view of moving the seed cell corer from and to its pocket 14, an operating means is provided, which is adapted to be engaged by the cored fruit fitted to the rotary support. In this instance, this operating means embodies an inverted cup-shaped member 22, the top surface 23 of which is presented upwardly for engagement with the lower portion of the fruit, as illustrated in Fig. 5. The flange of this cup shaped member is interiorly threaded at 22ª to be engaged by the screw threaded ends of the fingers 25 which project radially from a sleeve 26 movable axially on the cylindrical portion 13 of the rotary support. Connection between the operating means and the cell corer is preferably effected through a pin 27, arranged within the inverted cup shaped member and extending through a slot 28 in the arm 19 of the bell crank lever. Nuts 29 on said pin 27 serve as abutments for moving the arm 19 in opposite directions. A helical spring or other yielding device 31 surrounds the sleeve 26 and engages the arms 25 at its upper end, the lower end of said spring resting against an abutment disk 32 which rests against an adjustable nut or abutment 33 adapted to turn on the collar 9 through screw threads 34. It is apparent that by adjusting the adjustable abutment 33 through a tool introduced through the openings 35, the amount of movement of the operating member for the seed cell corer may be varied, due to the fact that the greater the movement, the greater the amount the seed cell corer 15 is projected from the pocket 14.

The operation of the invention will be understood from the foregoing description, but it may be summarized as follows: Power is communicated through the shaft 7 to the pulley 10, which turns the rotary support for the cored apple. During this turning the seed cell corer 15 lies within the pocket 14. When a cored apple is fitted over the rotary support, its lower portion engages the surface 23 and moves the operating means downwardly or in the direction of the axis of the rotary support until the lower end of the sleeve 26 cooperates with the abutement 32. With this downward movement, motion is communicated to the seed cell corer, throwing the latter on its pivot 18 to position the seed cell corer which turning with the rotary support removes the seed cell from the cored apple. The amount of this removal is determined by adjusting the nut or abutment 33 with reference to the operating means. When the apple is removed, the spring 31 moves the operating member in the opposite direction and carries the seed cell corer into the pocket 14.

From the foregoing it will be seen that there has been provided an improved seed cell removing apparatus in which the seed cell corer is operated through a means which turns with the rotary support, and relative movement between the support and the operating means is effected in the direction of the axis of the rotary support for effecting the movement of the seed cell corer. In this instance, the relative movement takes place through the movement of the operating means on the support, but it is apparent that the invention is not limited to this arrangement and that any arrangement in which a relative movement takes place between these parts is within the scope of this invention. The operating means is in the form of a housing or member guided axially on and off the rotary support and moved in one direction under the action of the spring. A connection is provided between this member and an arm on a bell crank lever pivoted within a pocket of the rotary support and carrying the blade or cutter which effects the removal of the seed cell. Relative movement between the operating means and the rotary support may be varied to control the movement of the seed cell corer to correspond to the amount of material desired to be removed from the cored apple.

What I claim as my invention and desire to secure Letters Patent is:

1. A seed cell removing apparatus comprising a rotary support for a cored apple, a seed cell corer movably mounted on said rotary support, an operating means for effecting the movement of the seed cell corer on said rotary support, said operating means turning with said rotary support and being mounted to be engaged by a cored apple fitted to the rotary support and to be moved in the direction of the axis of the rotary support to effect the movement of the seed cell corer relatively to the rotary support.

2. A seed cell removing apparatus comprising a rotary support for a cored apple, a seed cell corer mounted on said support, and movable toward and from the axis of the latter, an operating member turning with said support, movable axially thereof and arranged to be engaged by an apple fitted to said support to effect such axial movement away from the free end of the support.

3. A seed cell removing apparatus comprising a rotary support for a cored apple, a seed cell corer mounted on said support, and movable toward and from the axis of the latter, an operating member turning with said support, movable axially thereof and arranged to be engaged by an apple fitted to said support to effect such axial movement away from the free end of the support, and spring means moving said operating means in the opposite direction.

4. A seed cell removing apparatus comprising a rotary support for a cored apple, a seed cell corer mounted on said support to move toward and from the axis of turning of said support, an operating means turning with said support, movable axially thereof and arranged to be engaged by an apple fitted to the support to effect such axial movement, spring means moving said operating means in the opposite direction, and an adjustable stop for limiting the movement of said operating means to vary the movement of the seed cell corer.

5. A seed cell removing apparatus comprising a rotary support for a cored apple, a seed cell corer mounted on said support and movable toward and from the axis of the latter, an operating means movable axially of the support turning with the support and arranged to be engaged by an apple fitted to the support to effect such axial movement away from the free end of the support, and an adjustable stop turning with the support for determining the movement of such operating member to determine the movement of the seed cell corer away from the axis of the support.

6. A seed cell removing apparatus comprising a rotary support for a cored apple, a seed cell corer pivotally mounted on said support about an axis extending transversely of the support to cause the effective portion of the seed cell corer to move toward and from the axis of the rotary support, said seed cell corer having an arm extending laterally from the support, an operating member surrounding the support, turning therewith and connected with said arm, said operating member being arranged to be engaged by an apple fitted to the support to effect such axial movement of the member away from the free end of the support, and spring means acting on said member for moving it in the opposite direction.

7. A seed cell removing apparatus comprising a rotary support for a cored apple, a seed cell corer pivotally mounted on said support to turn therein about an axis to permit the effective portion of the seed cell corer to move toward and from the axis of the support, said seed cell corer having an arm extending laterally therefrom and from the rotary support, an operating member enclosing said arm, turning with the support, movable axially of said support, and arranged to be engaged by an apple fitted to the support to effect such axial movement away from the free end of the support, and a helical spring surrounding said support and tending to move said member toward the free end of the support.

BURTON C. COONS.